US012791513B2

(12) United States Patent
Furuta et al.

(10) Patent No.: US 12,791,513 B2
(45) Date of Patent: Nov. 10, 2026

(54) SENSOR ELEMENT AND GAS SENSOR

(71) Applicant: Niterra CO., LTD., Nagoya (JP)

(72) Inventors: Hitoshi Furuta, Nagoya (JP); Daisuke Sakurai, Nagoya (JP); Kei Yoshikawa, Nagoya (JP); Kentaro Kamada, Nagoya (JP); Tetsuo Yamada, Nagoya (JP)

(73) Assignee: Niterra CO., LTD., Nagoya (JP)

( * ) Notice: Subject to any disclaimer, the term of this patent is extended or adjusted under 35 U.S.C. 154(b) by 101 days.

(21) Appl. No.: 19/032,339

(22) Filed: Jan. 20, 2025

(65) Prior Publication Data

US 2025/0244283 A1 Jul. 31, 2025

(30) Foreign Application Priority Data

Jan. 25, 2024 (JP) ................................ 2024-009157
Nov. 5, 2024 (JP) ................................ 2024-193703

(51) Int. Cl.
*G01N 27/407* (2006.01)
*G01M 15/10* (2006.01)

(52) U.S. Cl.
CPC ...... *G01N 27/4071* (2013.01); *G01M 15/102* (2013.01)

(58) Field of Classification Search
CPC ............ G01N 27/4071; G01N 27/406; G01N 27/407-41; G01M 15/102
See application file for complete search history.

(56) References Cited

U.S. PATENT DOCUMENTS

2021/0080423 A1* 3/2021 Furuta ................ G01N 27/4074

FOREIGN PATENT DOCUMENTS

JP 202151058 A 4/2021
WO WO-2021100569 A1 * 5/2021 ........... G01N 27/409

* cited by examiner

*Primary Examiner* — Shizhi Qian
*Assistant Examiner* — Vivian A Tran
(74) *Attorney, Agent, or Firm* — Leason Ellis LLP; Edward J. Ellis; Melvin C. Garner

(57) ABSTRACT

A plate-shaped sensor element comprising an internal space 10G that extends in the axial line direction of the sensor element. When viewed at a cross section perpendicular to the axial line direction, at a corner portion of a first inner surface S1 closest to an outer surface of the sensor element in the internal space, a projection 80 extending from the corner portion toward the internal space is formed. Further, a void G2 is formed between a tip of the projection and the first inner surface.

6 Claims, 7 Drawing Sheets

SENSOR ELEMENT AND GAS SENSOR

CROSS-REFERENCE TO RELATED APPLICATION(S)

This application claims the benefit of priority to Japanese Patent Applications No. 2024-009157 filed on Jan. 25, 2024 and No. 2024-193703 filed on Nov. 5, 2024, the contents of all of which are incorporated herein by reference in their entities.

FIELD OF THE INVENTION

The present invention relates to a sensor element used preferably for detecting the concentration of a particular gas contained in, for example, combustion gas or exhaust gas of a combustor, an internal combustion engine, etc., to a gas sensor having the sensor element, and to a method for manufacturing the sensor element.

BACKGROUND OF THE INVENTION

Conventionally, a gas sensor is used for detecting the concentration of a particular component (oxygen, etc.) in exhaust gas of an internal combustion engine. The gas sensor internally has a sensor element. According to a known structure of the sensor element, the sensor element has a plate shape in which a plurality of ceramic layers are laminated, and has a solid electrolyte body and a pair of electrodes disposed on the solid electrolyte body. One of the two electrodes faces an air (atmosphere) introduction hole which opens toward the interior of the sensor element (see Japanese Patent Application Laid-Open (kokai) No. 2021-51058). This air introduction hole is in communication with the internal space of the element.

When the internal space is to be formed, a paste containing a burn-out-type carbon is used, and due to contraction caused when this paste burns out, a crack may be caused at a corner portion of the internal space. Therefore, in order to suppress this thermal cracking, in the technology of Japanese Patent Application Laid-Open (kokai) No. 2021-51058, a ceramic layer is provided at the peripheral edge of the internal space.

PRIOR ART DOCUMENT

Patent Document

[Patent Document 1] Japanese Patent Application Laid-Open (kokai) No. 2021-51058

PROBLEMS TO BE SOLVED BY THE INVENTION

Meanwhile, as a problem separate from the above-described thermal cracking, in a case where an internal space is provided in the sensor element, if a load is applied to the sensor element, a stress may be concentrated to a corner portion of the internal space, whereby a crack may be caused.

Therefore, an object of the present invention is to provide a sensor element and a gas sensor in which occurrence of cracks due to concentration of a stress to a corner portion of the internal space is suppressed.

SUMMARY OF THE INVENTION

Means for Solving the Problems

In order to solve the above problem, a sensor element of the present invention is a plate-shaped sensor element having an internal space that extends in an axial line direction of the sensor elemenet, wherein when viewed at a cross section perpendicular to the axial line direction of the internal space, at a corner portion of a first inner surface closest to an outer surface of the sensor element in the internal space, a projection extending from the corner portion toward the internal space is formed, and a void is formed between a tip of the projection and the first inner surface.

With this sensor element, since the void is formed between the tip of the projection and the first inner surface, and the tip of the projection is not constrained by the inner surface of the internal space. Therefore, when a stress such as bending is applied to the sensor element, even if a stress is applied to a corner portion of the internal space, the stress can be released at the tip of the projection. As a result, occurrence of cracks due to concentration of a stress to a corner portion of the internal space can be suppressed.

In the sensor element according to the present invention, the projection may have $ZrO_2$ as a main component.

When the projection has $ZrO_2$ as the main component, since $ZrO_2$ has a high strength and undergoes phase transition with respect to an external force, the volume increases, and thus, occurrence of cracks due to concentration of a stress can be further suppressed.

In the sensor element according to the present invention, the internal space may be in communication with an air introduction hole.

With this sensor element, when the projections are provided at the corner portions of the first inner surface, the volume of the internal space becomes large as compared with a case where the material of the projections is provided over the entire surface of the first inner surface instead of the projections, and thus, more air can be introduced.

In the sensor element according to the present invention, one of a pair of electrodes forming a cell may be disposed at a portion extending from a second inner surface opposed to the first inner surface, toward an outer surface of the sensor element.

With this sensor element, as compared with a case where the electrode is disposed on the first inner surface side where the projections are present, the air flow in the internal space is less likely to be disturbed on the second inner surface side, and the sensor output becomes stable.

In the sensor element according to the present invention, the projection may be porous.

When each projection is porous, the volume of the projection in the internal space becomes small as compared with a case where the projection is solid, and thus, the effective volume of the internal space increases.

A gas sensor of the present invention is a gas sensor comprising: the sensor element; and a metallic shell holding the sensor element.

Effects of the Invention

The present invention makes it possible to provide a sensor element and a gas sensor in which occurrence of cracks due to concentration of a stress to a corner portion of the internal space is suppressed.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

An embodiment of the present invention will next be described.

Figure 1:
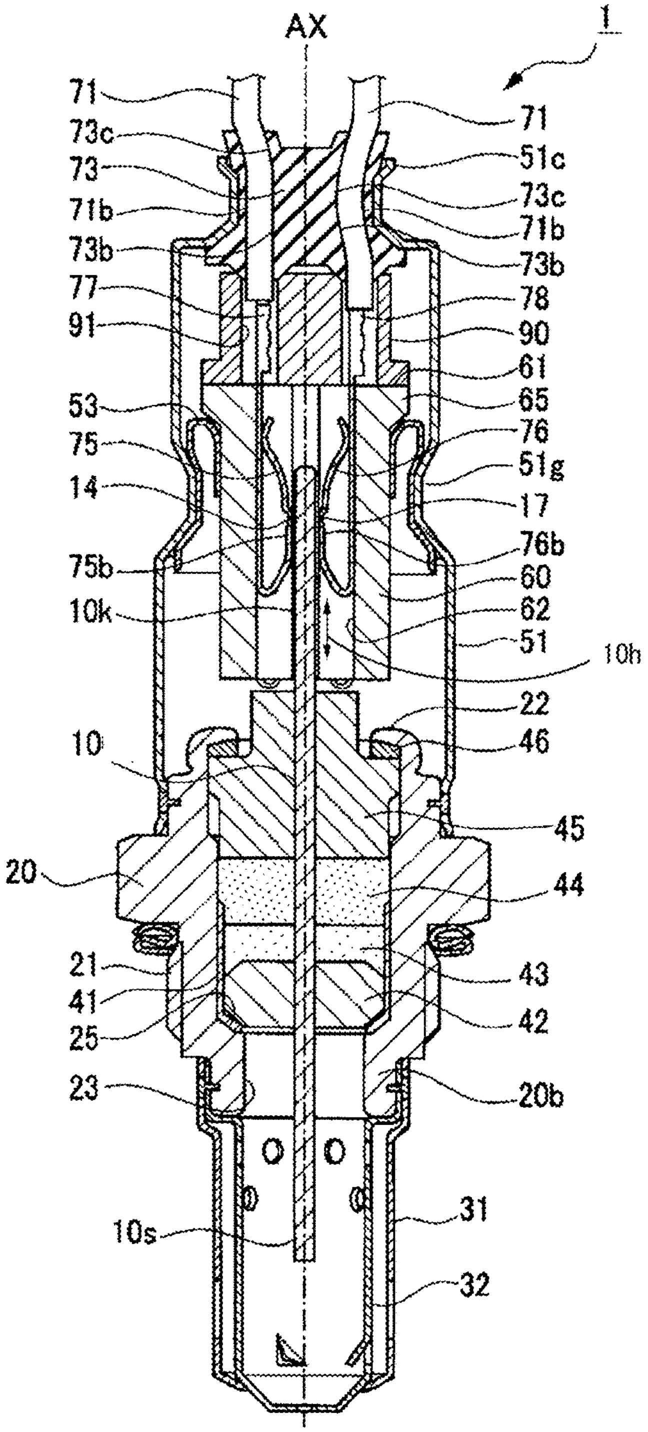
FIG. 1 is a sectional view of a gas sensor ($NO_x$ sensor) according to an embodiment of the present invention, taken along a longitudinal direction thereof.
Figure 2:
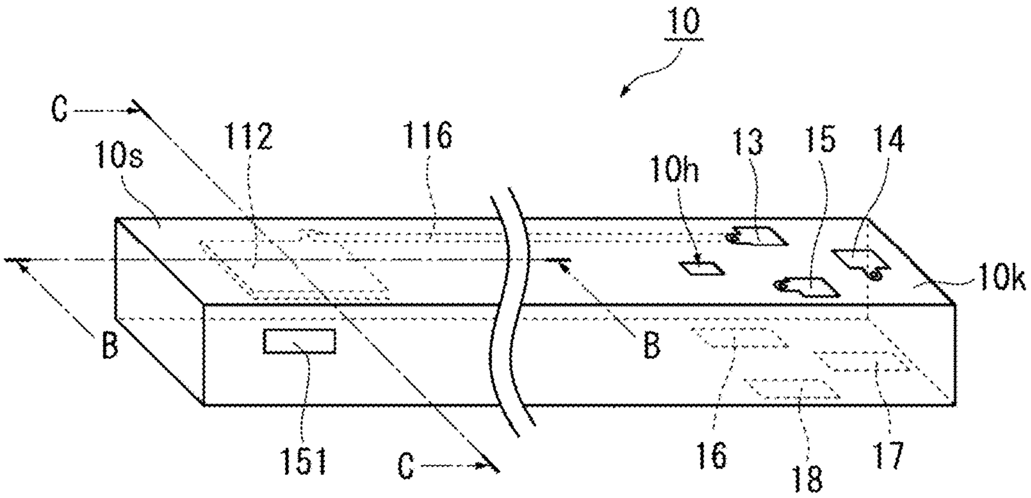
FIG. 2 is a perspective view of the sensor element.
Figure 3:
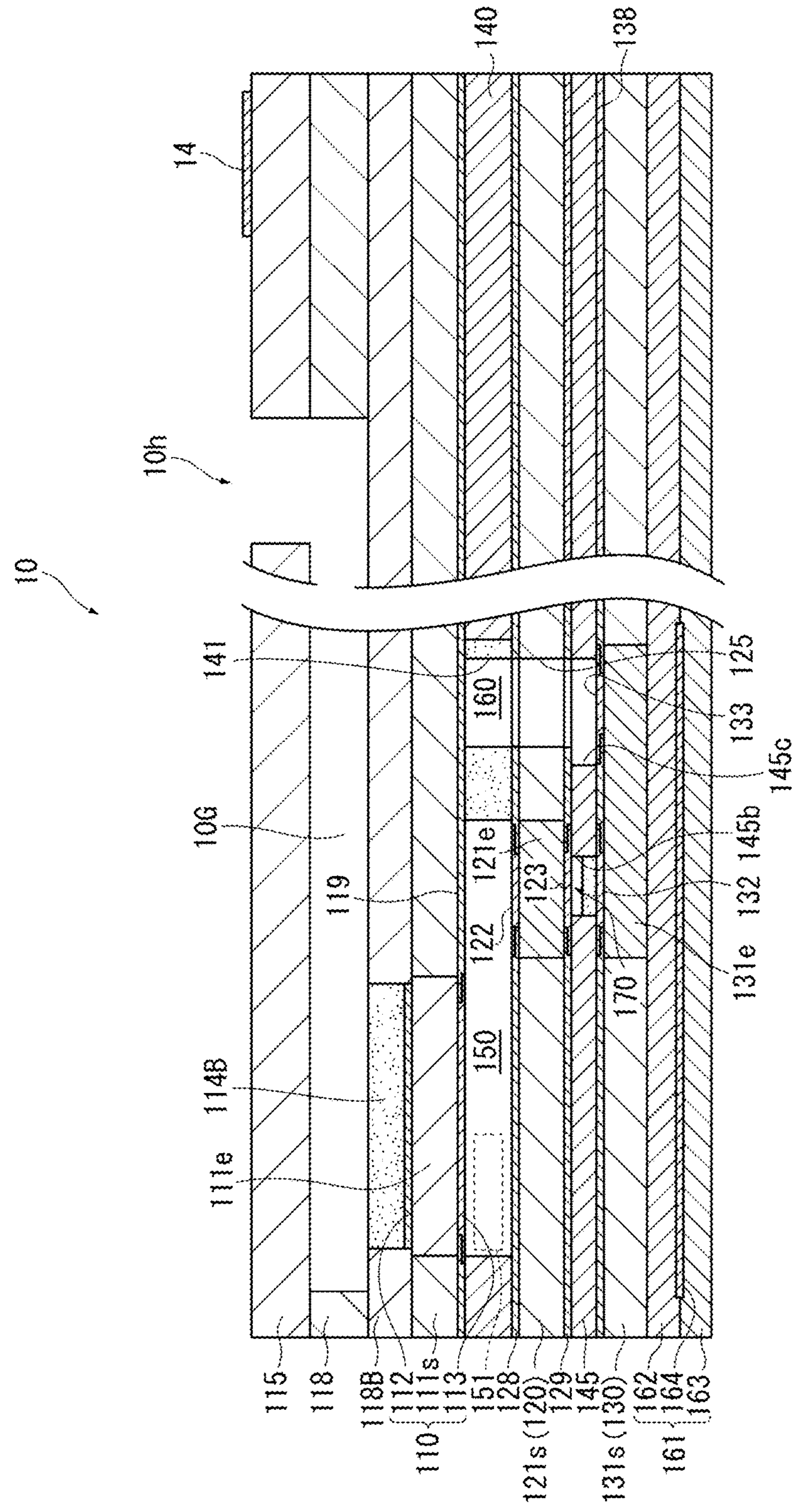
FIG. 3 is a sectional view taken along line B-B of FIG. 2.
Figure 4:
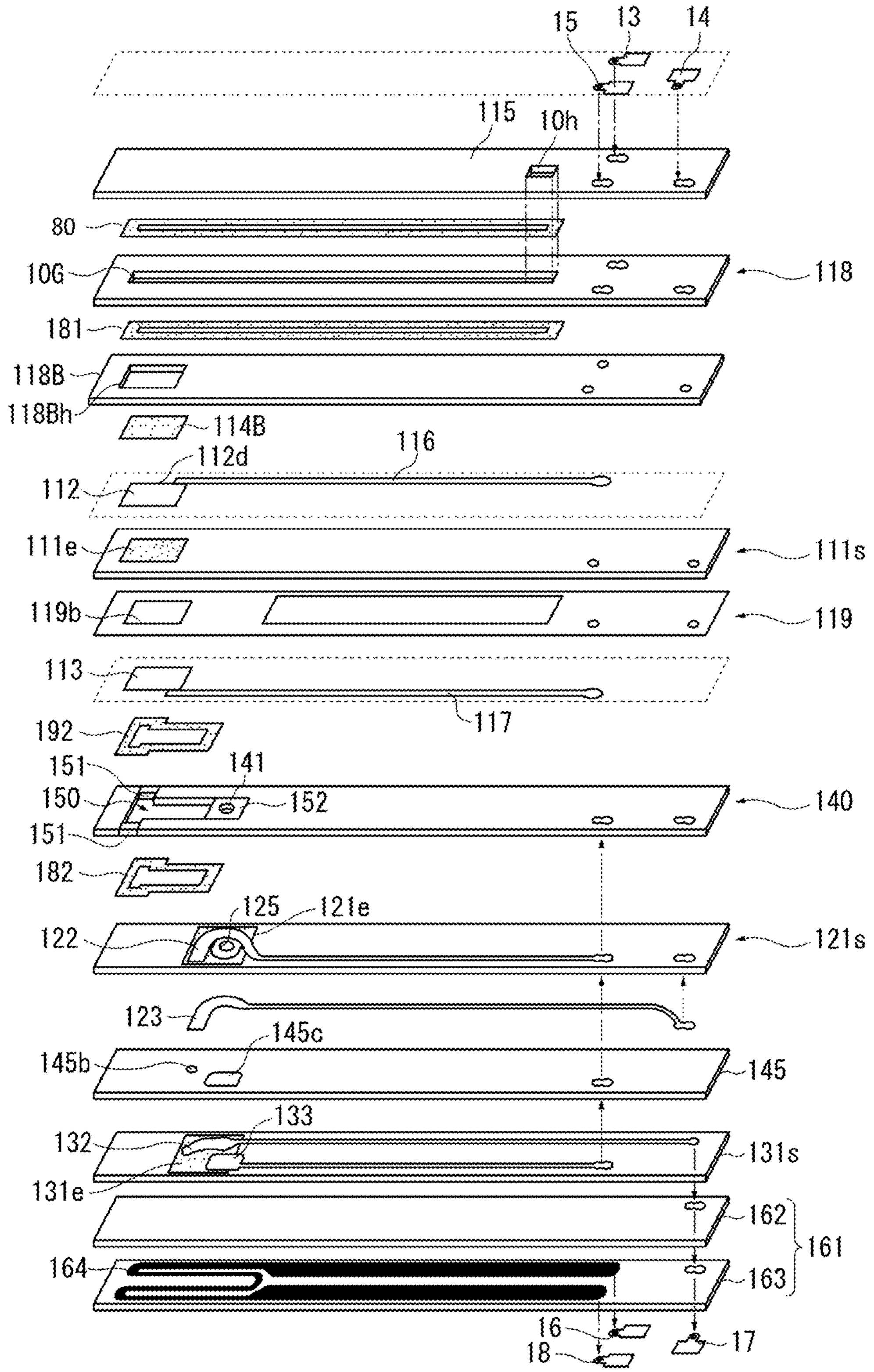
FIG. 4 is an exploded perspective view of the sensor element.
Figure 5:
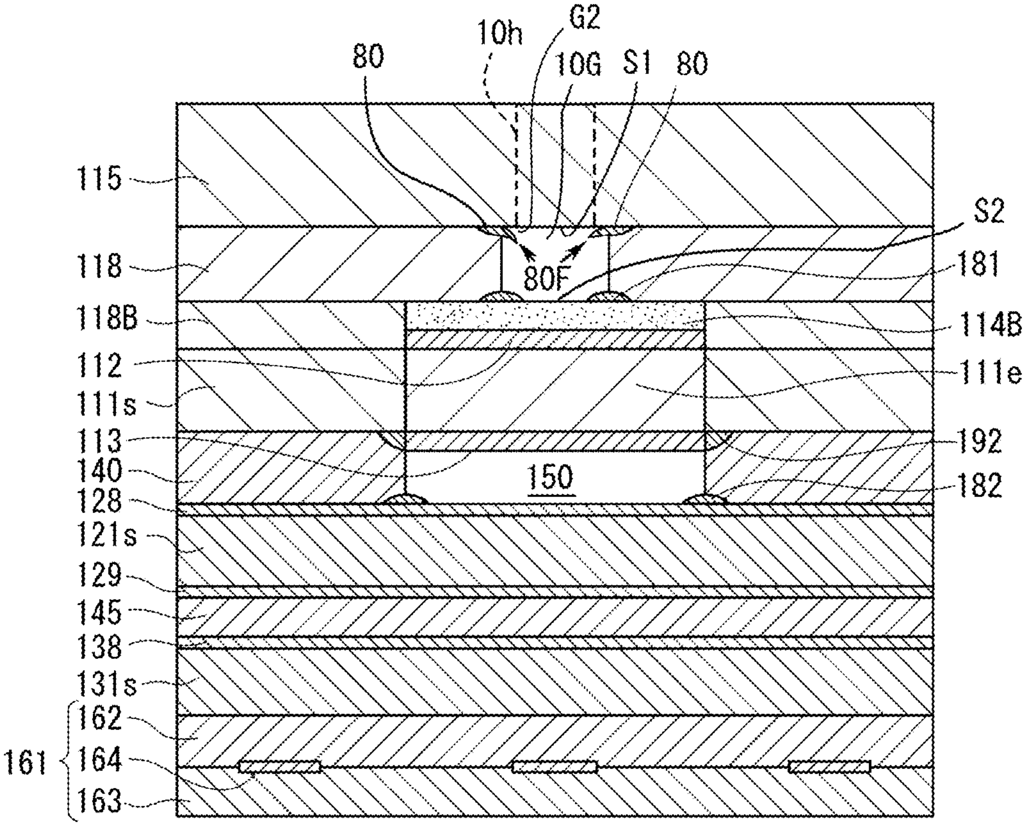
FIG. 5 is a sectional view taken along line C-C of FIG. 2.

FIG. 1 is a longitudinal sectional view (a sectional view cut in a longitudinal direction along an axial line AX) of a gas sensor ($NO_x$ sensor) 1 according to an embodiment of the present invention; FIG. 2 is a perspective view of a sensor element 10; FIG. 3 is a sectional view taken along line B-B (axial line AX) of FIG. 2; FIG. 4 is an exploded perspective view of the sensor element 10; and FIG. 5 is a sectional view taken along line C-C (a line orthogonal to the axial line AX) of FIG. 2.

Notably, a direction along the axial line AX of the sensor element (axial direction) is called the "longitudinal direction" as appropriate. A "width direction" of the sensor element is perpendicular to the "longitudinal direction (axial direction)."

The gas sensor 1 is an $NO_x$ sensor having the sensor element 10 capable of detecting the concentration of a particular gas ($NO_x$) in exhaust gas, which is gas under measurement, and attached, for use, to an exhaust pipe (not shown) of an internal combustion engine. The gas sensor 1 includes a tubular metallic shell 20 having a screw portion 21 formed on an outer surface thereof at a predetermined position and adapted to fix the gas sensor 1 to the exhaust pipe. The sensor element 10 has a narrow, elongated plate shape extending in the direction of the axial line AX and is held in the metallic shell 20.

More specifically, the gas sensor 1 further includes a holding member 60 having an insertion hole 62 into which a rear end portion 10*k* (an upper end portion in FIG. 1) of the sensor element 10 is inserted, and six terminal members held inside the holding member 60. Notably, FIG. 1 shows only two (namely, terminal members 75 and 76) of the six terminal members.

A total of six electrode terminals 13 to 18 (FIG. 1 shows only the electrode terminals 14 and 17), each having a rectangular shape in plan view, are formed on the rear end portion 10*k* of the sensor element 10. The aforementioned terminal members are in elastic contact with and are thus electrically connected to the electrode terminals 13 to 18, respectively. For example, an element contact portion 75*b* of the terminal member 75 is in elastic contact with and is thus electrically connected to the electrode terminal 14. Also, an element contact portion 76*b* of the terminal member 76 is in elastic contact with and is thus electrically connected to the electrode terminal 17.

Further, different lead wires 71 are electrically connected to the six terminal members (terminal members 75, 76, etc.), respectively. For example, as shown in FIG. 1, a lead wire crimp portion 77 of the terminal member 75 is crimped to a core wire of the lead wire 71. Also, a lead wire crimp portion 78 of the terminal member 76 is crimped to a core wire of another lead wire 71.

Also, the sensor element 10 has an atmosphere introduction opening 10*h* which opens at one of two main surfaces of the rear end portion 10*k* at a position located forward of the electrode terminals 13 to 15 and rearward of a ceramic sleeve 45, which will be described later (see FIG. 2). The atmosphere introduction opening 10*h* is disposed within the insertion hole 62 of the holding member 60.

As a result, a reference atmosphere confined within an outer casing 51, which will be described later, is introduced into the sensor element 10 from the atmosphere introduction opening 10*h*.

The metallic shell 20 is a tubular member having a through hole 23 extending therethrough in the direction of the axial line AX. The metallic shell 20 has a ledge 25 protruding radially inward and partially constituting the through hole 23. The metallic shell 20 holds the sensor element 10 in the through hole 23 while allowing a forward end portion 10*s* of the sensor element 10 to protrude outward (downward in FIG. 1) from a forward end thereof and allowing the rear end portion 10*k* of the sensor element 10 to protrude outward (upward in FIG. 1) from a rear end thereof.

In the through hole 23 of the metallic shell 20, there are disposed an annular ceramic holder 42, two talc rings 43 and 44 formed by talc powder being charged annularly, and the ceramic sleeve 45. More specifically, the ceramic holder 42, the talc rings 43 and 44, and the ceramic sleeve 45 are stacked in this order from the axially forward side (the lower side in FIG. 1) of the metallic shell 20 to the axially rear side (the upper side in FIG. 1) while radially surrounding the sensor element 10.

A metal cup 41 is disposed between the ceramic holder 42 and the ledge 25 of the metallic shell 20. Also, a crimp ring 46 is disposed between the ceramic sleeve 45 and a crimp portion 22 of the metallic shell 20. The crimp portion 22 of the metallic shell 20 is crimped in such a manner as to press forward the ceramic sleeve 45 through the crimp ring 46.

An outer protector 31 and an inner protector 32 which are made of metal (specifically, stainless steel) and have a plurality of holes are welded to a forward end portion 20*b* of the metallic shell 20 in such a manner as to cover the forward end portion 10*s* of the sensor element 10. Meanwhile, the outer casing 51 is welded to a rear end portion of the metallic shell 20. The outer casing 51 has a tubular shape extending in the direction of the axial line AX and surrounds the sensor element 10.

The holding member 60 is a tubular member formed of an electrically insulating material (specifically, alumina) and having the insertion hole 62 extending therethrough in the direction of the axial line AX. The aforementioned six terminal members (terminal members 75, 76, etc.) are disposed within the insertion hole 62 (see FIG. 1). The holding member 60 has a collar portion 65 formed at a rear end portion thereof and protruding radially outward. The holding member 60 is held by an internal support member 53 in such a manner that the collar portion 65 is in contact with the internal support member 53. Notably, the internal support member 53 is held to the outer casing 51 by means of a crimp portion 51*g* of the outer casing 51 being crimped radially inward.

An insulation member 90 is disposed on a rear end surface 61 of the holding member 60. The insulation member 90 is formed of an electrically insulating material (specifically, alumina) and has a cylindrical shape. The insulation member 90 has six through holes 91 extending therethrough in the direction of the axial line AX. The lead wire crimp portions (lead wire crimp portions 77, 78, etc.) of the aforementioned terminal members are disposed in the through holes 91, respectively.

An elastic seal member 73 formed of fluororubber is disposed radially inward of a rear end opening portion 51*c* of the outer casing 51 located at an axially rear end portion (an upper end portion in FIG. 1) of the outer casing 51. The elastic seal member 73 has six cylindrical insertion holes 73*c* extending therethrough in the direction of the axial line AX. The insertion holes 73*c* are defined by insertion hole surfaces 73*b* (cylindrical inner wall surfaces), respectively, of the elastic seal member 73. The lead wires 71 are inserted through the insertion holes 73*c* in one-to-one relation. The lead wires 71 extend to the outside of the gas sensor 1 through the insertion holes 73*c* of the elastic seal member 73. The elastic seal member 73 is radially deformed in an elastically compressive manner through radially inward crimping of the rear end opening portion 51*c* of the outer casing 51, whereby the insertion hole surfaces 73*b* and corresponding outer circumferential surfaces 71*b* of the lead wires 71 are brought into close contact with one another, thereby establishing a watertight seal between the insertion hole surfaces 73*b* and the corresponding outer circumferential surfaces 71*b* of the lead wires 71.

Meanwhile, as shown in FIG. 3, the sensor element 10 includes solid electrolyte bodies 111*e*, 121*e*, and 131*e* formed respectively in plate-shaped insulation layers 111*s*, 121*s*, and 131*s*, and insulators 140 and 145 disposed between the solid electrolyte bodies 111*e*, 121*e*, and 131*e*, and has a structure in which these members are laminated together in the direction of lamination. The sensor element 10 further includes a heater 161 laminated on the back surface of the solid electrolyte body 131*e*. The heater 161 includes plate-shaped insulators 162 and 163 formed primarily of alumina and a heater pattern 164 (formed primarily of Pt) embedded between the insulators 162 and 163.

Notably, the solid electrolyte bodies 111*e*, 121*e*, and 131*e* have approximately rectangular shapes, respectively, and are formed respectively in rectangular openings provided in forward end portions of the insulation layers 111*s*, 121*s*, and 131*s*. In the present embodiment, the solid electrolyte bodies 111*e* and 131*e* are formed by transfer of sheet-shaped members to respectively predetermined positions. However, the material for the solid electrolyte bodies 111*e* and 131*e* may be embedded in the respective openings.

The solid electrolyte bodies 111*e*, 121*e*, and 131*e* are formed of zirconia, which is solid electrolyte, and have oxygen ion conductivity. A porous Ip1 positive electrode 112 is provided on the front surface of the solid electrolyte body 111*e*. A porous Ip1 negative electrode 113 is provided on the back surface of the solid electrolyte body 111*e*. Further, a surface of the Ip1 positive electrode 112 is covered with a porous layer 114B.

An Ip1 positive lead 116 is connected to the Ip1 positive electrode 112 (see FIGS. 2 and 4). An Ip1 negative lead 117 (FIG. 4) is connected to the Ip1 negative electrode 113.

As shown in FIG. 4, a third dense layer 118B is laminated on surfaces of the Ip1 positive electrode 112 and the Ip1 positive lead 116 and has a rectangular opening 118Bh formed in a forward end portion thereof. The porous layer 114B is charged into the opening 118Bh.

As shown in FIG. 4, a gas-impermeable first dense layer 118 formed of alumina or the like and having an internal space 10G is laminated on the front surface of the third dense layer 118B. The porous layer 114B is partially exposed from the internal space 10G. Side surfaces of the porous layer 114B are covered with the third dense layer 118B and surrounded by the dense layers 115, 118, and 118B.

The internal space 10G extends straight from the vicinity of the porous layer 114B to a region where the internal space 10G communicates with the atmosphere introduction opening 10*h*. The first dense layer 118 has through holes located rearward of the internal space 10G for establishing electrical communication with the electrode terminals 13 to 15.

Notably, the atmosphere introduction opening 10*h* is smaller in dimension in the width direction than the internal space 10G (see FIG. 5).

Further, a gas-impermeable second dense layer 115 formed of alumina or the like is laminated on the front surface of the first dense layer 118 and closes the internal space 10G. As a result, the Ip1 positive electrode 112 covered with the porous layer 114B is disposed in the internal space 10G surrounded by the dense layers 115 and 118, thereby being prevented from coming into contact with the gas under measurement.

The atmosphere introduction opening 10*h* is a rectangular opening formed in the second dense layer 115 at a position corresponding to the rear end of the internal space 10G, and the internal space 10G communicates with the atmosphere introduction opening 10*h*. The atmosphere introduction opening 10*h* opens at a position located rearward of first porous bodies 151, which will be described later, and allows introduction of the atmosphere, not an exhaust gas. As a result, the Ip1 positive electrode 112 is exposed through the porous layer 114B to the atmosphere introduced from the atmosphere introduction opening 10*h*.

The solid electrolyte body 111*e* and the electrodes 112 and 113 constitute an Ip1 cell (pump cell) 110. The Ip1 cell 110 pumps oxygen (so-called oxygen pumping) in/out between an atmosphere in contact with the electrode 112 (an atmosphere within the internal space 10G different from the gas under measurement around the sensor element 10) and an atmosphere in contact with the electrode 113 (an atmosphere within a first measuring chamber 150, which will be described later; i.e., the gas under measurement around the sensor element 10) in response to pump current Ip1 flowing between the electrodes 112 and 113.

The solid electrolyte body 121*e* is disposed in such a manner as to face the solid electrolyte body 111*e* in the direction of lamination with the insulator 140 intervening therebetween. A porous Vs negative electrode 122 is provided on the front surface side (upper surface side in FIG. 2) of the solid electrolyte body 121*e*. Also, a porous Vs positive electrode 123 is provided on the back surface side (lower surface side in FIG. 2) of the solid electrolyte body 121*e*.

The first measuring chamber 150, which is an internal space of the sensor element, is formed between the solid electrolyte body 111*e* and the solid electrolyte body 121*e*. The first measuring chamber 150 is an internal space of the sensor element 10 into which the gas under measurement (exhaust gas) flowing through an exhaust passage is first introduced. The first measuring chamber 150 communicates with the outside of the sensor element 10 through the first porous bodies 151 (diffusion resistor portions) (see FIGS. 2 and 4) having gas permeability and water permeability. The first porous bodies 151 are provided at the lateral sides of the first measuring chamber 150 as partitions between the first measuring chamber 150 and the outside of the sensor element 10. The first porous bodies 151 limit the amount of inflow per unit time (diffusion rate) of exhaust gas into the first measuring chamber 150.

A second porous body 152 is provided on the rear side (right side in FIG. 2) of the first measuring chamber 150 as a partition between the first measuring chamber 150 and a second measuring chamber 160, which will be described herein later. The second porous body 152 limits the amount of flow per unit time of exhaust gas.

The solid electrolyte body 121*e* and the electrodes 122 and 123 constitute a Vs cell (detection cell) 120. The Vs cell 120 mainly generates electromotive force in accordance with a difference in partial pressure of oxygen between two atmospheres (an atmosphere within the first measuring chamber 150 in contact with the electrode 122 and an atmosphere within a reference oxygen chamber 170 in contact with the electrode 123) separated by the solid electrolyte body 121*e*.

The solid electrolyte body 131*e* is disposed in such a manner as to face the solid electrolyte body 121*e* in the direction of lamination with the insulator 145 sandwiched therebetween. A porous Ip2 positive electrode 132 and a porous Ip2 negative electrode 133 are provided on the front surface side (upper surface side in FIG. 2) of the solid electrolyte body 131*e*.

The reference oxygen chamber 170, which is an isolated small space, is formed between the Ip2 positive electrode 132 and the Vs positive electrode 123. The reference oxygen chamber 170 is an opening portion 145*b* formed in the insulator 145. In the reference oxygen chamber 170, a porous body made of ceramic is disposed at a side toward the Ip2 positive electrode 132.

A second measuring chamber 160, which is an internal space of the sensor element, is formed at such a position as to face the Ip2 negative electrode 133 in the direction of lamination. The second measuring chamber 160 is composed of an opening portion 145*c* extending through the insulator 145 in the direction of lamination, an opening portion 125 extending through the solid electrolyte body 121*e* in the direction of lamination, and an opening portion 141 extending through the insulator 140 in the direction of lamination.

The first measuring chamber 150 and the second measuring chamber 160 communicate with each other through the second porous body 152 having gas permeability and water permeability. Therefore, the second measuring chamber 160 communicates with the outside of the sensor element 10 through the first porous bodies 151, the first measuring chamber 150, and the second porous body 152.

The solid electrolyte body 131*e* and the electrodes 132 and 133 constitute an Ip2 cell 130 (second pump cell) for detecting $NO_x$ concentration. The Ip2 cell 130 moves oxygen (oxygen ions) formed through decomposition of $NO_x$ in the second measuring chamber 160, to the reference oxygen chamber 170 through the solid electrolyte body 131*e*. At this time, electric current flows between the electrode 132 and the electrode 133 in accordance with the concentration of $NO_x$ contained in exhaust gas (gas under measurement) introduced into the second measuring chamber 160.

Next, with reference to FIG. 5, a characteristic part of the present invention will be described.

As shown in FIG. 5, the cross section perpendicular to the axial-line AX direction of the internal space 10G serving as the internal space has a rectangular shape.

Then, when the cross section in FIG. 5 is viewed, at corner portions of a first inner surface S1 closest to the outer surface of the sensor element 10 in the internal space 10G, projections 80 extending from the corner portions toward the internal space 10G are formed. Further, a void G2 is formed between the tip of each projection 80 and the first inner surface S1.

Thus, the void G2 is formed between the tip of the projection 80 and the first inner surface S1, and the tip of the projection 80 is not constrained by the inner surface of the internal space 10G. Therefore, when a stress such as bending is applied to the sensor element 10, even if a stress is applied to a corner portion of the internal space 10G, the stress can be released at the tip of the projection 80. As a result, occurrence of cracks due to concentration of a stress to a corner portion of the internal space 10G can be suppressed.

In the present example, since the void G2 is formed between the tip of the projection 80 and the first inner surface S1, the tip of the projection 80 forms a free end 80F. The void G2 is a part of the internal space 10G.

In the present example, the projection 80 is formed at each of corner portions at both ends of the first inner surface S1.

The material forming the projection 80 is a ceramic, for example, and preferably, a ceramic material different from the ceramic material of the main component forming the wall surface of the internal space 10G is used as the main component. Here, the "main component" means a component having a content amount exceeding 50 mass %.

When the projection 80 has $ZrO_2$ as the main component, since $ZrO_2$ has a high strength and undergoes phase transition with respect to an external force, the volume increases, and thus, occurrence of cracks due to concentration of a stress can be further suppressed. In this case, as the dense layers 115, 118, 118B, and the porous layer 114B, which form the wall surface of the internal space 10G, a composition containing $Al_2O_3$ in an amount exceeding 50 mass % can be shown as an example.

In the present example, the internal space 10G serving as the internal space is in communication with the air introduction hole 10*h*. As described above, when the projections 80 are provided at the corner portions of the first inner surface S1, the volume of the internal space 10G becomes large as compared with a case where the material of the projections 80 is provided over the entire surface of the first inner surface S1 instead of the projections 80, and thus, more air can be introduced.

When each projection 80 is porous, the volume of the projection 80 in the internal space 10G becomes small as compared with a case where the projection 80 is solid, and thus, the effective volume of the internal space 10G increases.

The porosity of the projection 80 is preferably 16% or more, and more preferably 35% or more. The upper limit of the porosity of the projection 80 is 75%, for example. The porosity can be calculated from the ratio of the area of pores to the area of the projection in the field of view, by taking an SEM image of a cross section of the projection.

Further, as shown in FIG. 5, in the present example, the electrode 112, which is one of the pair of electrodes 112, 113 forming the cell (Ip1 cell) 110, is disposed at a portion extending from a second inner surface S2 opposed to the first inner surface S1, toward the outer surface (the lower side in FIG. 5) of the sensor element 10.

With this, as compared with a case where the electrode 112 is disposed on the first inner surface S1 side where the projections 80 are present, the air flow in the internal space 10G is less likely to be disturbed on the second inner surface S2 side, and the sensor output becomes stable.

Detection of $NO_x$ concentration by the gas sensor 1 of the present embodiment will now be described briefly.

As the heater pattern 164 rises in temperature, the solid electrolyte bodies 111*e*, 121*e*, and 131*e* of the sensor element 10 are heated and activated. As a result, the Ip1 cell 110, the Vs cell 120, and the Ip2 cell 130 start their operations.

Exhaust gas which flows through an exhaust passage (not shown) is introduced into the first measuring chamber 150 while being limited in flow rate by the first porous bodies 151. At this time, in the Vs cell 120, a weak current Icp is caused to flow from the electrode 123 to the electrode 122. As a result, oxygen contained in exhaust gas can receive electrons from the electrode 122, which is a negative electrode, within the first measuring chamber 150 and becomes oxygen ions. The oxygen ions flow through the solid electrolyte body 121*e* and move into the reference oxygen chamber 170. That is, as a result of flow of the current Icp between the electrodes 122 and 123, oxygen in the first measuring chamber 150 is sent to the reference oxygen chamber 170.

In the case where the oxygen concentration of exhaust gas introduced into the first measuring chamber 150 is lower than a predetermined value, the current Ip1 is caused to flow through the Ip1 cell 110 in such a manner that the electrode 112 becomes a negative electrode, so as to pump oxygen into the first measuring chamber 150 from the outside of the sensor element 10. By contrast, in the case where the oxygen concentration of exhaust gas introduced into the first measuring chamber 150 is higher than the predetermined value, the current Ip1 is caused to flow through the Ip1 cell 110 in such a manner that the electrode 113 becomes a negative electrode, so as to pump out oxygen from inside the first measuring chamber 150 to the outside of the sensor element 10.

Exhaust gas whose oxygen concentration has been adjusted in the first measuring chamber 150 as mentioned above is introduced into the second measuring chamber 160 through the second porous body 152. $NO_x$ contained in exhaust gas comes into contact with the electrode 133 within the second measuring chamber 160 and is decomposed (reduced) on the electrode 133 into nitrogen and oxygen through application of the voltage Vp2 between the electrodes 132 and 133. Oxygen generated through the decomposition flows, in the form of oxygen ions, through the solid electrolyte body 131*e* and moves into the reference oxygen chamber 170. At this time, residual oxygen which has not been pumped out from the first measuring chamber 150 similarly moves into the reference oxygen chamber 170 through operation of the Ip2 cell 130. Thus, current stemming from $NO_x$ and current stemming from the residual oxygen flow through the Ip2 cell 130. Notably, oxygen which has moved into the reference oxygen chamber 170 is discharged to the outside (the atmosphere) through the Vs positive electrode 123 exposed to the reference oxygen chamber 170, and the Vs positive lead and through the Ip2 positive electrode 132 and the Ip2 positive lead; accordingly, the Vs positive lead and the Ip2 positive lead are porous.

Since the residual oxygen which has not been pumped out from the first measuring chamber 150 is adjusted in concentration to the predetermined value as mentioned above, current stemming from the residual oxygen can be considered generally constant and thus has little influence on variation in current stemming from $NO_x$; thus, current flowing through the Ip2 cell 130 is proportional to $NO_x$ concentration. Therefore, by means of detecting the current Ip2 which flows through the Ip2 cell 130, the concentration of $NO_x$ in exhaust gas can be detected on the basis of the detected current Ip2.

In the present embodiment, an alumina insulation layer 119 is formed on the back surface of the insulation layer 111*s*, excluding a region corresponding to the Ip1 negative electrode 113. The Ip1 negative electrode 113 is in contact with the solid electrolyte body 111*e* through a through hole 119*b* (see FIG. 4) extending through the alumina insulation layer 119 in the direction of lamination.

Further, in the present embodiment, an alumina insulation layer 128 is formed on the front surface of the insulation layer 121*s*, excluding a region corresponding to the Vs negative electrode 122. The Vs negative electrode 122 is in contact with the solid electrolyte body 121*e* through a through hole (not shown) extending through the alumina insulation layer 128 in the direction of lamination.

Further, an alumina insulation layer 129 is formed on the back surface of the insulation layer 121*s*, excluding a region corresponding to the Vs positive electrode 123. The Vs positive electrode 123 is in contact with the solid electrolyte body 121*e* through a through hole (not shown) extending through the alumina insulation layer 129 in the direction of lamination.

Further, in the present embodiment, an alumina insulation layer 138 is formed on the front surface of the insulation layer 131*s*, excluding a region corresponding to the Ip2 positive electrode 132. The Ip2 positive electrode 132 is in contact with the solid electrolyte body 131*e* through a through hole (not shown) extending through the alumina insulation layer 138 in the direction of lamination. Further, the alumina insulation layer 138 is formed on the front surface of the insulation layer 131*s* also, excluding a region corresponding to the Ip2 negative electrode 133. The Ip2 negative electrode 133 is in contact with the solid electrolyte body 131*e* through a through hole (not shown) extending through the alumina insulation layer 138 in the direction of lamination.

Next, with reference to FIGS. 6A to 6D, an example of a production method for the sensor element according to the embodiment of the present invention will be described. FIGS. 6A to 6D are each a partial enlarged view showing the sensor element 10 near the internal space 10G.

Figure 6A:
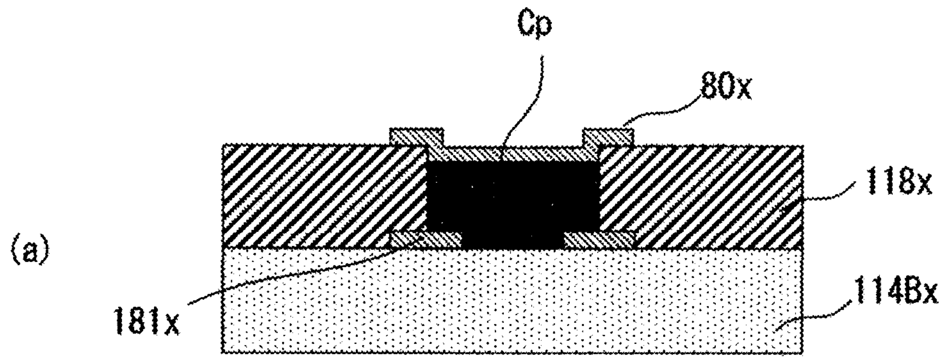
FIG. 6A is a view illustrating an example of a process of a production method for the sensor element according to the embodiment of the present invention.

First, as shown in FIG. 6A, together with other ceramic layer green sheets in FIG. 5, a paste, and the like, a porous layer paste 114Bx is applied to a predetermined position. Further, a first dense layer green sheet 118*x* in which a portion to serve as the internal space 10G is hollowed out is stacked on the porous layer paste 114Bx. Further, a burn-out-type sheet Cp that contains carbon is embedded in the portion, to serve as the internal space 10G, of the first dense layer green sheet 118*x*.

In a portion between the porous layer paste 114Bx and the boundary between the first dense layer green sheet 118*x* and the burn-out-type sheet Cp, a paste 181*x* containing a ceramic is applied in advance so as to extend across the first dense layer green sheet 118*x* and the burn-out-type sheet Cp.

This paste 181*x* suppresses occurrence of a crack between the first dense layer green sheet 118*x* and the burn-out-type sheet Cp during sintering.

Further, a projection paste 80*x* is applied to the entirety of the upper surface of the burn-out-type sheet Cp and the upper surface of the boundary between the burn-out-type sheet Cp and the first dense layer green sheet 118*x*.

Here, since the thickness of the burn-out-type sheet Cp is thinner than the thickness of the first dense layer green sheet 118*x*, the projection paste 80*x* extends downwardly with a step from the boundary between the burn-out-type sheet Cp and the first dense layer green sheet 118*x* toward the upper surface of the burn-out-type sheet Cp.

Figure 6B:
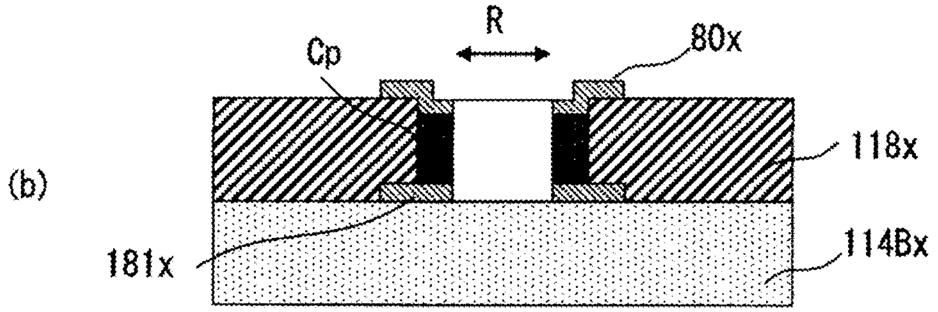
FIG. 6B is a view illustrating an example of a process of a production method for the sensor element according to the embodiment of the present invention.

Next, as shown in FIG. 6B, a center portion R of the projection paste 80*x* and the burn-out-type sheet Cp is hollowed out. As shown in FIG. 2, in the present example, when viewed from the upper surface, the burn-out-type sheet Cp, which will become the internal space 10G, has an elongated rectangular shape (strip shape), and the center portion R also has a rectangular shape smaller than that of the burn-out-type sheet Cp.

Figure 6C:
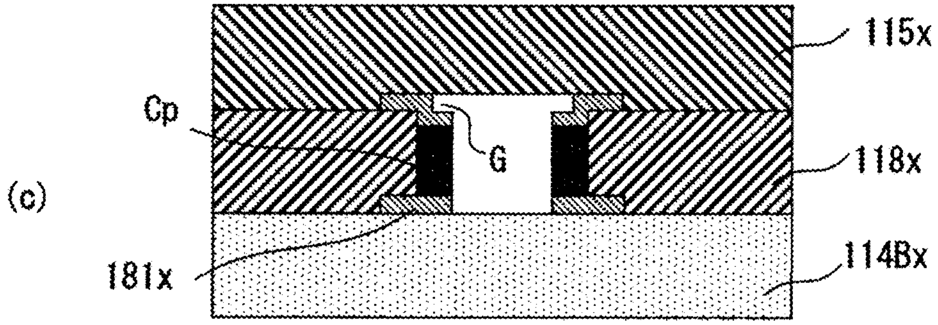
FIG. 6C is a view illustrating an example of a process of a production method for the sensor element according to the embodiment of the present invention.

Next, as shown in FIG. 6C, a second dense layer green sheet 115*x* is stacked on the burn-out-type sheet Cp and the first dense layer green sheet 118*x*.

Here, since the projection paste 80*x* extends downwardly with a step at the upper surface of the burn-out-type sheet Cp, a gap G is formed between the second dense layer green sheet 115*x* and the projection paste 80*x* near the center portion R.

Figure 6D:
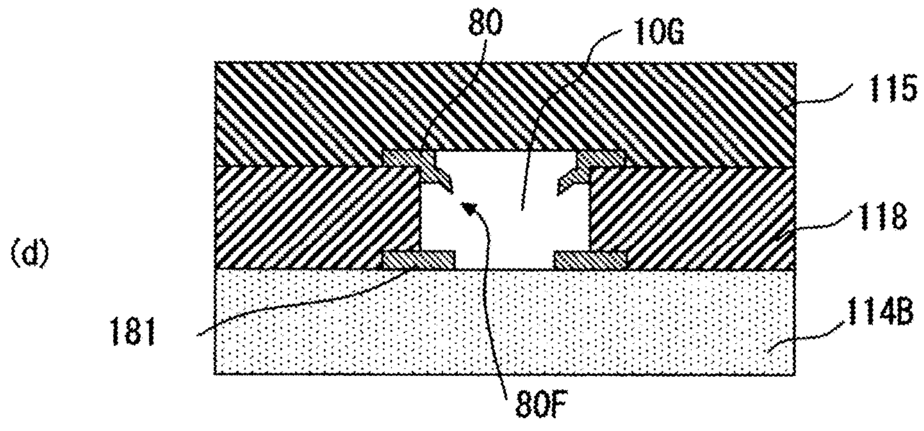
FIG. 6D is a view illustrating an example of a process of a production method for the sensor element according to the embodiment of the present invention.

Next, as shown in FIG. 6D, when the entirety has been sintered, the burn-out-type sheet Cp burns out, the internal space 10G is formed, and the sensor element 10 is completed.

Here, since there is the gap G between the second dense layer green sheet 115*x* and the projection paste 80*x*, the tip of each projection 80 becomes the free end 80F in association with the sintering, and extends toward the internal space 10G.

The present invention is not limited to the above embodiments, and encompasses various modifications and equivalents which fall within the ideas and scope of the invention.

It is sufficient that the internal space of the sensor element is a hollow space, and examples of the internal space include an atmosphere introduction hole and various measuring chambers. The shape of the internal space is not particularly limited.

The shape of the projection is also not limited.

The present invention can be applied to a sensor element (a gas sensor) having at least a detection cell (one or more cells) and thus can be applied to the $NO_x$ sensor element ($NO_x$ sensor) of the present embodiment. However, the application of the present invention is not limited thereto, and the invention encompasses various modifications and equivalents which fall within the ideas and scope of the invention. For example, the present invention may be applied to an oxygen sensor (oxygen sensor element) for detecting the oxygen concentration of gas under measurement, an HC sensor (HC sensor element) for detecting the HC concentration of gas under measurement, etc.

The shape of the cross section perpendicular to the axial-line AX direction of the internal space 10G is not limited, and is a rectangular shape, for example.

DESCRIPTION OF REFERENCE NUMERALS

1: gas sensor
10: sensor element
10G: internal space
10*h*: atmosphere introduction opening
20: metallic shell
110: cell
112, 113: pair of electrodes
112: one of the pair of electrodes
AX: longitudinal direction (axial line)
S1: first inner surface
S2: second inner surface
G2: void

The invention claimed is:

1. A plate-shaped sensor element comprising:
an internal space that extends in an axial line direction of the plate-shaped sensor element, wherein
when viewed at a cross section perpendicular to the axial line direction of the internal space, at a corner portion of a first inner surface closest to an outer surface of the plate-shaped sensor element in the internal space, a projection extending from the corner portion toward the internal space is formed, and
a void is formed between a tip of the projection and the first inner surface.

2. The plate-shaped sensor element according to claim 1, wherein the projection has $ZrO_2$ as a main component.

3. The plate-shaped sensor element according to claim 1, wherein the internal space is in communication with an air introduction hole.

4. The plate-shaped sensor element according to claim 1, wherein one of a pair of electrodes forming a cell is disposed at a portion extending from a second inner surface opposed to the first inner surface, toward the outer surface of the plate-shaped sensor element.

5. The plate-shaped sensor element according to claim 1, wherein the projection is porous.

6. A gas sensor comprising:
the plate-shaped sensor element according to claim 1; and
a metallic shell holding the plate-shaped sensor element.

* * * * *